United States Patent [19]
Allen, Jr.

[11] 3,762,643
[45] Oct. 2, 1973

[54] IRRIGATING APPARATUS
[75] Inventor: Russell G. Allen, Jr., Amarillo, Tex.
[73] Assignee: Hydro Corporation, Amarillo, Tex.
[22] Filed: Jan. 20, 1972
[21] Appl. No.: 219,539

Related U.S. Application Data
[63] Continuation of Ser. No. 879,698, Nov. 25, 1969, abandoned.

[52] U.S. Cl. .............................. 239/212, 184/15 R
[51] Int. Cl. .............................................. B05b 3/12
[58] Field of Search .......................... 239/177, 212; 137/344; 184/13 R, 15 R

[56] References Cited
UNITED STATES PATENTS

| | | | |
|---|---|---|---|
| 3,353,751 | 11/1967 | Dowd | 239/212 X |
| 3,425,629 | 2/1969 | Bobard | 239/212 X |
| 2,230,575 | 2/1941 | Myers | 184/13 R |
| 1,960,693 | 5/1934 | Bryant | 184/15 R |
| 1,971,311 | 8/1934 | Chapman | 184/15 R |
| 3,463,267 | 8/1969 | Dooley et al | 184/15 R X |

Primary Examiner—M. Henson Wood, Jr.
Assistant Examiner—Michael Mar
Attorney—Ely Silverman

[57] ABSTRACT

In an irrigating apparatus comprising a water conduit supported above crop height on self-propelled, movable support towers, wherein at least one, preferably all, of the towers has motor and transmission means (e.g., a worm gear and chain and sprockets) to drive its movable base (e.g., a drive wheel), the present invention provides rigid enclosure means for the transmission means to hold a reservoir of lubricant in contact with the transmission means and to prevent leaves, sand, dirt, foliage from the crop, etc., from coming into contact with and fouling the transmission means.

30 Claims, 4 Drawing Figures

PATENTED OCT 2 1973　　3,762,643
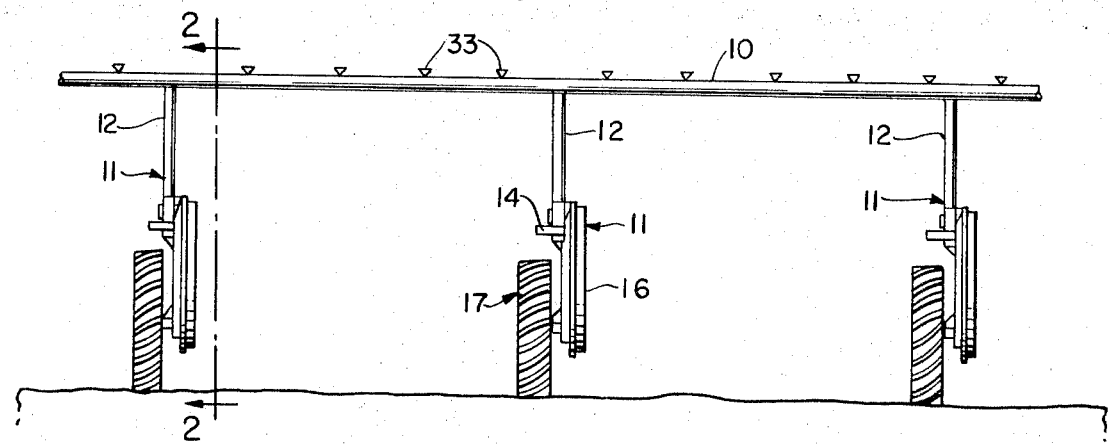
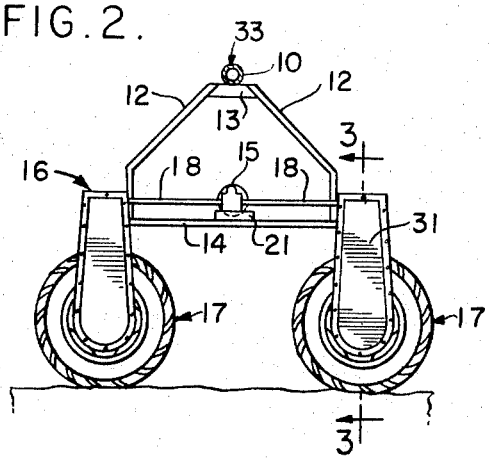
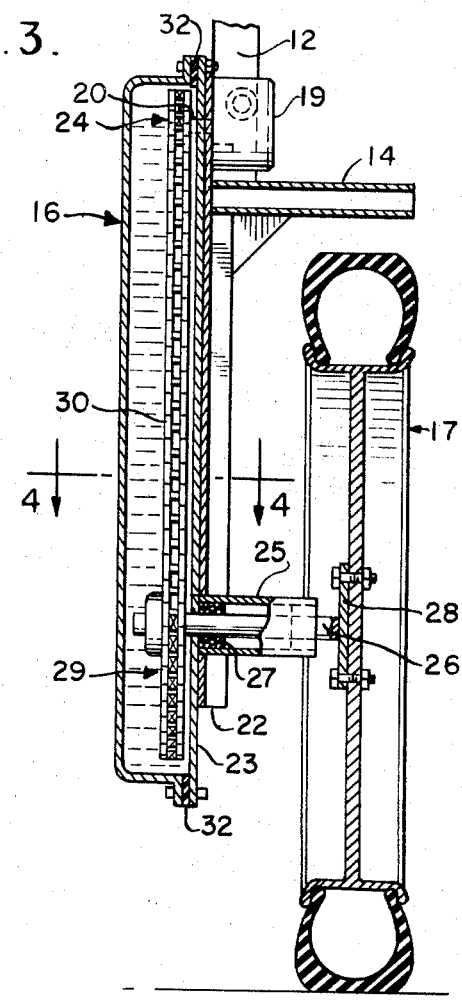
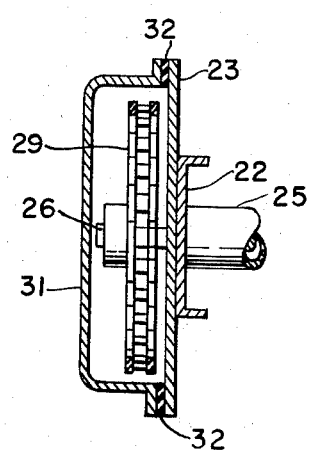
INVENTOR
RUSSEL G. ALLEN, Jr.
BY McLean, Morton & Boustead
ATTORNEYS

IRRIGATING APPARATUS

This is a continuation, of application Ser. No. 879,698 filed Nov. 25, 1969 now abandoned.

This invention relates to an improvement in the type of self-propelled irrigating apparatus which comprises a linear water transporting conduit which has a plurality of water sprinkling means and which is moved over the ground during operation. More particularly, it relates to such an apparatus which comprises support members for the conduit, which support members are driven by a motor that is connected, via transmission means, to a movable base.

Self-propelled irrigating apparatus which comprise a linear water transporting conduit supported above the ground by a plurality of movable support members have been used extensively for watering large areas of ground from overhead. Various designs for the apparatus are disclosed in the prior art. Essentially, each one is comprised of the linear conduit: a plurality of water sprinkling means at spaced intervals along the conduit for sprinkling water onto the ground; a plurality of movable support members, also disposed at spaced intervals along the conduit, for supporting the conduit above the ground, preferably above crop height and drive means associated with at least one of the support members for moving the conduit over the ground in a generally perpendicular direction to the line of the conduit. The drive means has usually been composed of some form of a movable base, a motor having an output, and transmission means operatively connecting motor output to the movable base. Examples of movable bases which can be employed include drive wheels, endless tracks, walking feet, etc. Motors which can be used include electrically powered motors, hydraulic motors of either the oil or water type, air motors, rotary fluid or air exhaust motors, and air and water turbine motors.

A problem which has persisted, however, in these irrigation apparatus is that the drive systems have experienced rapid and severe wear and, consequently, early and frequent breakdowns. By the present invention there is provided an improved apparatus of this type as far as resistance to wear and failure of the drive means is concerned. This improvement is accomplished by means of the apparatus rigid enclosure for each of the transmission of means contructed of oil-resistant and weather-resistant material. The enclosure means is attached to the support member and substantially completely envelops the transmission means. It is, however, spaced a sufficient distance away from the transmission means to provide a space within the enclosure for holding a reservoir of lubricant, e.g., grease or oil, in contact with the transmission means. The enclosure means itself does a great deal toward preventing water, sand, dirt, foilage from the crop, straw, sticks and so forth from coming into contact with the transmission means. But when the space between the enclosure and the transmission means is filled with a lubricant, e.g., grease or oil, then the transmission means is enveloped in an almost impenetrable medium, so far as the above-mentioned elements are concerned. The result is a greatly extended useful life for the apparatus with significantly fewer breakdowns or stoppages than with prior art apparatus.

The improvement of the present invention is particularly suitable for use in connection with those irrigators having means for pivotally connecting one end of the linear water transporting conduit to a stationary water supply line. These apparatus revolve around the mouth of the stationary water line when in operation, and, depending upon the length of the conduit, etc., will often complete a full circle in, say, 12 to 240 hours. In these revolving irrigators it is often preferred that each of the support members have the aforementioned drive means and that the apparatus include alignment means for automatically maintaining the linear conduit in a substantially straight line during operation of the drive means.

Numerous different alignment means are disclosed in the prior art and any suitable one of these can be used with the apparatus of the present invention. The alignment of a revolving irrigator of this type is usually maintained by each of the motors being separately controllable, so that any one or more can be shut off without shutting off the rest. Sensing means are then employed to detect when one of the support members has moved a certain distance out in front of the other members, at which time a signal will be transmitted to the on-off switch for the motor on the advanced member, which signal will turn the motor off until the lagging support members catch up, thus re-establishing the linear alignment and preventing rupture of the conduit.

Any suitable transmission means which will convey the motive force to the movable base so as to provide for movement of the support member can be employed. Gears which can be used in the transmission means can be of the worm, helical, herringbone, spur, bevel, miter, spiral miter, or spiral bevel type, and can be used in any suitable combinations. A worm gear can advantageously be included in the transmission means since it will prevent the support member from coasting down inclines and thus getting out of alignment. Drive shafts, roller chains and sprockets can also be used in the transmission means. Almost invariably it will be necessary, in order to move the apparatus satisfactorily, that the transmission means be so constructed as to provide for a reduction in the speed of the motor and an increase in the torque.

Preferably, the apparatus of this invention will be towable in the direction of the line of the conduit so as to facilitate its transport from one place of use to another. Accordingly, it is preferred that the movable bases of the support members be capable of being pivoted 90° to get into towing position. It is also desirable that there be means to disengage the movable base from the motor output or the transmission means or both during towing, i.e., to make the base free wheeling. Where a type of transmission means is employed which will permit the base to be moved only by the motor output, such as, for example, a transmission means including a worm gear, then it is imperative, if towing is to be possible, that the movable base be disengagable from the transmission means.

The material of which the enclosure for the transmission means is constructed is, as stated above, a rigid, solid material which will not be attacked by lubricating oil and which will not readily deteriorate upon exposure to the weather. Various metals and plastics satisfy these requirements. Aluminum, for example, is ideal for this purpose. The enclosure means can be in any desired shape so long as it does not interfere with the operation of the drive means. Advantageously, it will be provided with drain means near its bottom for ease in removing the lubricant and with a capped opening near its top to facilitate filling it with the lubricant. The enclosure means can constitute a single housing or a plurality of housings. Thus, for example, substantially the entire transmission means can be enclosed in a single housing or it can be treated in a segmented fashion with a plurality of non-interconnected housings. The latter means is especially useful where it is preferable to treat different portions of the transmission means with different types of lubricants, for example, with grease in one portion and with oil in another.

The invention may be better understood by considering the accompanying drawings, which are illustrative only and not to be considered as limiting the invention.

Referring now to the drawings,

FIG. 1 is a front view of a section, encompassing three identical support members, of an irrigator embodying the improvement of the present invention.

FIG. 2 is a side view, taken along line 2—2 of FIG. 1, of one of the support members of the irrigator.

FIG. 3 is an enlarged rear sectional view, taken along line 3—3 of FIG. 2, illustrating the drive means associated with each of the wheels of the support members.

Finally, FIG. 4 is a top sectional view, taken along line 4—4 of FIG. 3, of the lower sprocket assembly of the transmission means.

Considering the apparatus of the drawings in more detail, water conduit 10 is supported at spaced intervals along its length by a series of support members, designated generally as 11. Spray nozzles 33 are located at spaced intervals along conduit 10. Each support member 11 is identical and is made up of a frame assembly, comprised of two struts 12, upper crossbar 13, lower crossbar 14 and legs 22; electric motor 15; two sets of transmission means (designated generally as 16) and two drive wheels 17. The base 21 of electric motor 15 is mounted on lower crossbar 14, and the motor output is connected to dual drive shafts 18. Drive shaft 18 is connected to the input of gear box 19 which contains a worm gear (not shown) and an output in the form of drive sprocket shaft 20.

The gear box 19 is attached to leg 22, and drive sprocket shaft 20 protrudes through leg 22 and through backing plate 23 and terminates in drive sprocket 24. Backing plate 23 is attached to leg 22. Welded to leg 22 near the bottom thereof is tube 25, through which is mounted drive axle 26. Recessed within tube 25 at both ends thereof are bearings 27. Drive axle 26 terminates at one end in drive flange 28, and at the other end, after extending through backing plate 23, in driven sprocket 29. Drive flange 28 is bolted to drive wheel 17. Mounted on and around sprockets 24 and 29 is endless roller chain 30. Bolted to backing plate 23, through oil resistant rubber gasket 32, is housing 31.

Each of the support members 11 operates in the same manner. Electric motor 15, which is connected to a suitable power source (not shown), drives dual axles 18 and each of the latter is connected to the input of gear box 19. The output of gear box 19 drives sprocket 24, which drives roller chain 30, which drives sprocket 29. The rotation of sprocket 29 is transmitted via axle 26 and drive flange 28 to wheel 17. Rotation of the latter moves the frame assembly and conduit 10 which is supported thereon. Water is distributed from conduit 10 to the ground by spray nozzles 33. Alignment means for the apparatus, which are not shown, are conventional in the art and can be of any suitable design. Also, it will usually be preferred to supplement the support of conduit 10 by adding vertical extensions or towers to the frame assemblies of the support members and running suspension cables from these towers to the conduit, which is also not shown in the drawings but which is also well known in the art.

In the apparatus shown in the drawings, segmented enclosure means are employed, in that the transmission means for each drive wheel is substantially completely enveloped by virtue of gear box 19 on the one hand and by backing plate 23, gasket 32 and housing 31 on the other. The void space within gear box 19 can be filled with either a lubricating grease or oil, while the void space between housing 31 and backing plate 23 is preferably filled with a lubricating oil.

It is claimed:

1. In a self-propelled irrigating apparatus for watering an area of ground, said apparatus comprising a linear water transporting conduit supported above the ground by a plurality of movable support members disposed at spaced intervals along said conduit, said conduit having connected thereto a plurality of water sprinkling means at spaced intervals along the conduit for sprinkling water onto the ground, and at least one of said support members having drive means operatively attached thereto for moving said conduit over the ground in a generally perpendicular direction to the line of the conduit, said drive means comprising a movable base, a motor having an output, and transmission means operatively connecting the motor output to the movable base, the improvement comprising, for each of said transmission means, rigid enclosure means pivotally attached to said support member and constructed of oil-resistant and weather-resistant material, said enclosure means substantially completely enveloping said transmission means but being spaced apart therefrom a sufficient distance to provide a space within the enclosure for holding a reservoir of lubricant in contact with said transmission means.

2. The improvement of claim 1 wherein the apparatus has means for pivotally connecting one end of said linear conduit to a stationary water supply line.

3. The improvement of claim 2 wherein each of said support members has said drive means.

4. The improvement of claim 3 wherein said motor is electrically powered.

5. The improvement of claim 4 wherein said apparatus has alignment means for automatically maintaining said linear conduit in a substantially straight line during operation of said drive means.

6. The improvement of claim 5 wherein said transmission means comprises a worm gear and said movable base is a drive wheel.

7. The improvement of claim 6 wherein said worm gear is connected in driving relationship to a sprocket, which is in turn connected in driving relationship to an endless roller chain, which is in turn connected in driving relationship to a second sproket, which is in turn connected in driving relationship to said drive wheel.

8. The improvement of claim 7 wherein each of the support members has two drive wheels.

9. The improvement of claim 8 wherein each of the support members has a single motor to drive both drive wheels.

10. The improvement of claim 9 wherein the enclosure means is constructed of aluminum.

11. In a self-propelled irrigating apparatus for watering an area of ground, said apparatus comprising a linear water transporting conduit supported above the ground by a plurality of movable support members disposed at spaced intervals along said conduit, said conduit having connected thereto a plurality of water sprinkling means at spaced intervals along the conduit for sprinkling water onto the ground, and at least one of said support members having drive means operatively attached thereto for moving said conduit over the ground in a generally perpendicular direction to the line of the conduit, said drive means comprising a movable base, a motor having an output, and transmission means operatively connecting the motor output to the movable base, the improvement comprising, for each of said transmission means, rigid enclosure means pivotally attached to said support member and constructed of oil-resistant and weather-resistant material, said enclosure means substantially completely enveloping said transmission means but being spaced apart therefrom a sufficient distance to provide a space within the enclosure for holding a reservoir of lubricant in contact with said transmission means and said space is filled with a lubricant chosen from group consisting of grease and oil.

12. The improvement of claim 11 wherein one end of said linear water transporting conduit is pivotally connected to a stationary water supply line.

13. The improvement of claim 12 wherein each of said support members has said drive means.

14. The improvement of claim 13 wherein said motor is electrically powered.

15. The improvement of claim 14 wherein said apparatus has alignment means for automatically maintaining said linear conduit in a substantially straight line during operation of said drive means.

16. The improvement of claim 15 wherein said transmission means comprises a worm gear and said movable base is a drive wheel.

17. The improvement of claim 16 wherein said worm gear is connected in driving relationship to a sprocket, which is in turn connected in driving relationship to an endless roller chain, which is in turn connected in driving relationship to a second sprocket, which is in turn connected in driving relationship to said drive wheel.

18. The improvement of claim 17 wherein each of the support members has two drive wheels.

19. The improvement of claim 18 wherein each of the support members has a single motor to drive both drive wheels.

20. The improvement of claim 19 wherein the enclosure means is constructed of aluminum.

21. In a self-propelled irrigating apparatus for watering an area of ground, said apparatus comprising a linear water transporting conduit supported above the ground by a plurality of movable support members disposed at spaced intervals along said conduit, said conduit having connected thereto a plurality of water sprinkling means at spaced intervals along the conduit for sprinkling water onto the ground, and at least one of said support members having drive means operatively attached thereto for moving said conduit over the ground in a generally perpendicular direction to the line of the conduit, said driving means comprising at least one drive wheel having a wheel shaft, a drive motor and a drive shaft operatively connected to the drive motor, and transmission means operatively connecting the drive wheel with the wheel shaft including a sprocket on said drive shaft and a sprocket on the wheel shaft and an endless chain interconnecting said sprockets for transmitting rotational movement from the drive shaft to the wheel shaft, the improvement comprising a rigid enclosure means pivotally attached to said support member and constructed of an oil-resistant and weather-resistant material, said enclosure means substantially completely enclosing said chain and sprockets in sealed relation from the drive shaft and wheel shaft for sealing the interior, and a lubricant in the enclosure in an amount substantially to fill the same to a level above said chain and sprockets, said lubricant chosen from the group consisting of grease and oil.

22. The improvement of claim 21 wherein the apparatus has means for pivotally connecting one end of said linear conduit to a stationary water supply line.

23. The improvement of claim 22 wherein each of said support members has said drive means.

24. The improvement of claim 23 wherein said motor is electrically powered.

25. The improvement of claim 24 wherein said apparatus has alignment means for automatically maintaining said linear conduit in a substantially straight line during operation of said drive means.

26. The improvement of claim 25 wherein said transmission means comprises a worm gear and said movable base is a drive wheel.

27. The improvement of claim 26 wherein said worm gear is connected in driving relationship to a sprocket, which is in turn connected in driving relationship to an endless roller chain, which is in turn connected in driving relationship to a second sprocket, which is in turn connected in driving relationship to said drive wheel.

28. The improvement of claim 27 wherein each of the support members has two drive wheels.

29. The improvement of claim 28 wherein each of the support members has a single motor to drive both drive wheels.

30. The improvement of claim 29 wherein the enclosure means is constructed of aluminum.

* * * * *